United States Patent [19]

Robinson

[11] 4,331,846
[45] May 25, 1982

[54] TAILGATE LIFT CONTROL SAFETY CIRCUIT

[76] Inventor: Morris D. Robinson, 179 Via Los Miradores, Redondo Beach, Calif. 90277

[21] Appl. No.: 188,258

[22] Filed: Sep. 17, 1980

[51] Int. Cl.³ .............................................. H01H 3/16
[52] U.S. Cl. ..................................... 200/47; 414/545
[58] Field of Search .................. 200/47; 414/545, 557

[56] References Cited

U.S. PATENT DOCUMENTS

| | | | |
|---|---|---|---|
| 2,908,408 | 10/1959 | Reed | 414/545 |
| 3,024,926 | 3/1962 | Nolden | 414/545 |
| 3,439,134 | 4/1969 | Carli | 200/47 |
| 3,918,596 | 11/1975 | Ward | 414/545 |
| 3,968,890 | 7/1976 | Robson | 414/545 |
| 4,087,007 | 5/1978 | Drews | 414/545 |
| 4,266,106 | 5/1981 | Fraser | 200/47 |

Primary Examiner—Willis Little
Attorney, Agent, or Firm—Donald D. Mon

[57] ABSTRACT

For use with a vehicle tailgate lift that has a platform which when substantially level moves in an up and down movement, and which near and at its upper limit can also be moved in a folding mode, a circuit which enables the platform to be moved up, down or folded but which frustrates inadvertent folding of the platform by the provision of a safety circuit.

6 Claims, 2 Drawing Figures

TAILGATE LIFT CONTROL SAFETY CIRCUIT

FIELD OF THE INVENTION

This invention relates to tailgate lift platforms which are adapted to raise up and down in a lifting mode and at an upper level to fold in a folding mode, and to a safety circuit to frustrate inadvertent folding of the platform.

BACKGROUND OF THE INVENTION

Tailgate folding lifts are known which move up and down to lift and lower objects relative to a truck bed. When the loading operations are completed it is desired to drive the truck away, but with the platform tilted in a folded position against the back of the truck. Obviously, it is undesirable for the platform to engage in a folding mode with a person or cargo on it. It is an object of this invention to provide a safety circuit which will at least reduce the risk of this undesired result.

BRIEF DESCRIPTION OF THE INVENTION

This invention is carried out in combination with a tailgate lift as described, and includes an off-on platform up switch, an off-on platform down switch, and an off-on platform fold switch. The platform up and platform fold switches are in parallel connection with each other through a selector switch. A platform up limit switch is in series with the platform up switch. The selector switch enables either platform up or platform fold operation but never both at the same time. The platform down switch is alternatively enabled relative to the platform fold switch, by the selector switch. A selectible fold cam is adapted to enable or to prevent platform folding and to open the limit switch under certain conditions.

The above and other features of this invention will be fully understood from the following detailed description of the accompanying drawings, in which:

DETAILED DESCRIPTION OF THE INVENTION

Figure 2:
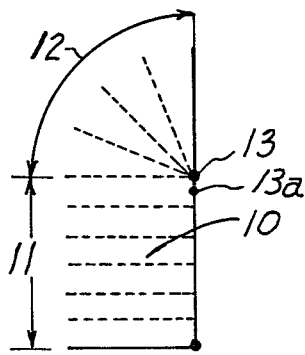
FIG. 2 is a schematic illustration of the modes of lifting and folding the platform.

FIG. 2 shows dotted lines 10 representative of various positions of the platform in its two modes. Range 11 is the lifting mode where the platform is substantially level and moves up and down. Range 12 is the folding mode where the platform folds from horizontal to substantially vertical starting at a level 13a below an upper elevation 13 that is located at the uppermost limit of the upward movement of the platform. Points 13 and 13a are on the path of the forward edge of the platform (relative to the forward direction of the vehicle) as it moves up and down. A limit switch 27 may be actuated below level 13a, as will later be described.

Figure 1:
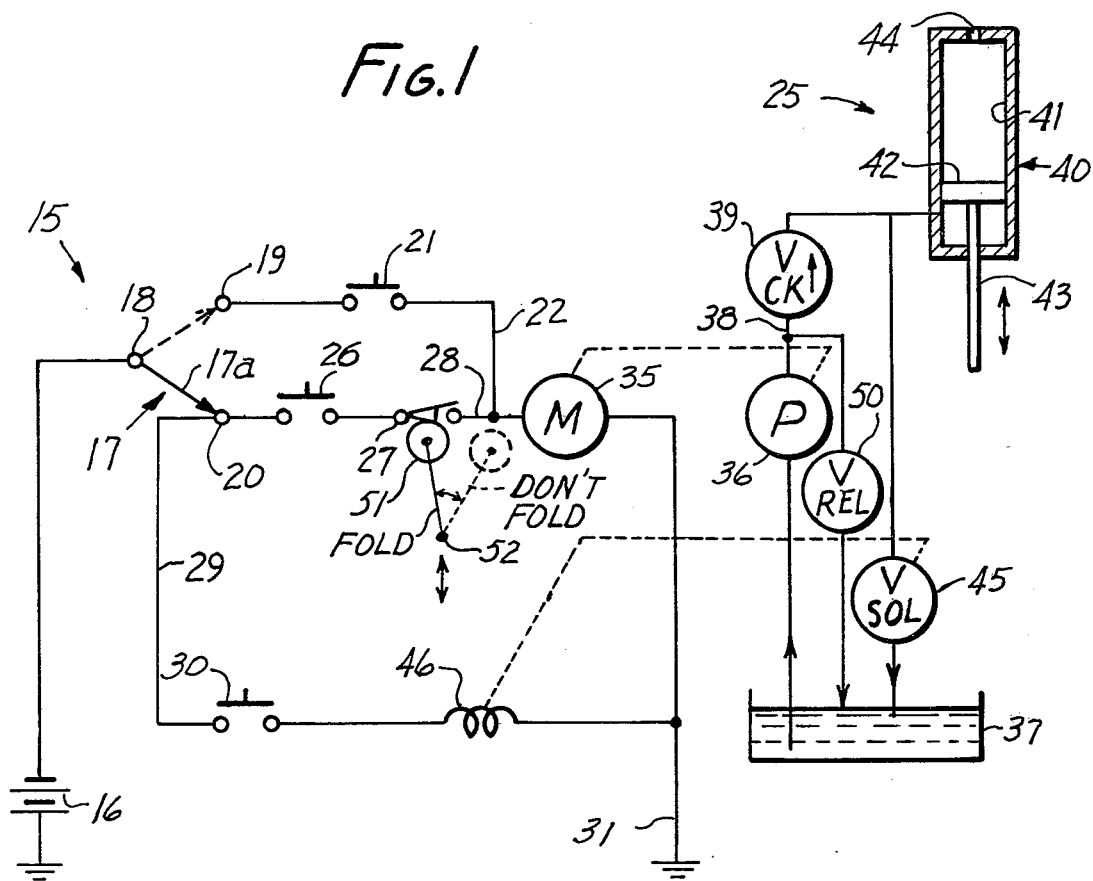
FIG. 1 is a circuit drawing showing the system according to the invention.

The movement of the platform is under control of a safety circuit 15 (FIG. 1). It begins at an energy source 16 which may be a generator or battery, and extends as a circuit to a platform selector switch 17. Platform selector switch 17 has a contactor 17a, a common contact 18 to which the contactor is always connected, and a pair of selectible contacts 19, 20. This switch forms the beginning of a selectible parallel circuit. One of said circuits begins with contact 19, and includes an off-on platform fold switch 21. Lead 22 connects this switch to a power means 25 yet to be described. Platform switch 17 has a "first condition" shown in dashed line that enables platform folding under certain circumstances and a "second condition" shown in solid line that enables platform upward movement under certain other circumstances.

Another branch of the parallel circuitry begins at contact 20 and includes an off-on platform up switch 26. This connects in series to a normally-closed platform limit switch 27 whose operation will be described below. A lead 28 joins to lead 22 and to the power source.

An off-on platform down switch 30 is connected to contact 20 and through a relay 46 is further connected to to a return circuit 31 such as a ground connection. It is adapted to enable or to disable the lift for downward movement.

Power means 25 in the example given is an electric motor 35 mechanically coupled to a hydraulic pump 36. Thus, completion of either of the circuits through the platform fold or platform up circuitry will cause the motor to run, operating the pump, which withdraws hydraulic fluid from a sump 37 and sends it under pressure through conduit 38 and unidirectional check valve 39 to a piston-cylinder assembly 40. The motor, the pump, and the piston-cylinder assembly are together described herein as "power means 25". It is obvious that instead of directly powering motor 35, a relay can be substituted, and the motor separately energized. Persons skilled in the control art will have no difficulty adapting the circuitry with this objective.

Piston-cylinder assembly 40 includes a cylinder 41, a piston 42, and a rod 43. This combination can operate the lifting gate in its up and down movement and its lifting and folding modes. Generally speaking, the lifting ("don't fold") mode simply raises the platform without interference by the cam until it reaches its upper limit 13.

The actuator uses a cylinder, it usually bottoms out at the upper limit, and the pressure from the pump will merely be released via a relief valve 50. Folding movement will begin at or near level 13a, and be completed when level 13 is reached by the forward end of the platform.

The cylinder has a vent 44 when fluid pressure is to be exerted on only one side of the piston. In the example given, fluid is pumped into the cylinder beneath the piston to cause upward or folding movement of the platform in the lifting mode. Downward movement, either unfolding or lowering will be caused by the inherent weight of the gate itself exerted on the rod. This movement will be enabled by permitting exhaust of fluid from the region beneath the piston. This is accomplished by a down valve 45 which is a solenoid valve under control of relay 46 which in turn is controlled by the off-on platform down switch 30.

The operation of the system is straight-forward. When the lift is to be moved up, the contactor is switched to make contact with contact 20 and the platform up switch is closed. Limit switch 27 will be closed at this time, because the mechanical selector will be set to the lifting ("don't fold") position. The motor will operate to power the pump, which will cause the piston-cylinder assembly to operate to raise the platform.

The mechanical folding of the platform is accomplished by a cam 51 ("mechanical selector means")

which is mounted to a pivot 52 on the platform so that it moves up and down with the platform. When in the solid line position shown as "fold", it will also encounter limit switch 27 while the platform is rising, at a level beneath level 13. This will open the limit switch and break the circuit which includes platform up switch 26. This will prevent the further rise of the platform under control of the platform-up switch while the cam is in the fold position. If the cam were in the "don't fold" position, it would not encounter the limit switch and the platform could continue to rise under control of the platform-up switch, but then the cam does not enable the platform to fold.

Folding of the platform requires that selector switch 17 be set in its first condition (dashed line) so contactor 17a engages contact 19 and also that platform fold switch 21 be closed, whereby to by-pass the opened limit switch 27, Switch 27 is opened before folding can occur by contact with cam 51 if the mechanical selector means is in its "fold" position. After switch 27 is by-passed it is unimportant whether the limit switch remains open or not. The cam exerts its physical control over the platform to cause it to fold while its forward edge rises form level 13a fold up to level 13, folding the platform in the process. During upward and folding operations, the platform down switch remains open so that the solenoid valve is closed to flow. When the down valve 45 is closed, hydraulic fluid cannot escape from the piston-cylinder assembly and the platform remains up. Now, to unfold the platform, the down switch is closed which will actuate relay 46 and open valve 45, provided that selector switch 17 is in the solid-line enabling position. The circuit through switch 27 from contact 20 is open because cam 51 in its "fold" position has opened switch 27. If platform-selector switch 17 is in the fold-enabling position (dashed line), down motion is impossible because there is no completed circuit to relay 46. This arrangement frustrates certain evasions which might be attempted. Hydraulic fluid can escape from the cylinder when selector 17a is in its second condition (solid line) in which contacts contact 20, and when platform down switch is also closed. The gate will first unfold (if it is folded) and will then move downwardly in the lowering mode until it reaches the ground. It will be noted that by providing the alternate circuitry shown in FIG. 1, the platform fold switch can be located at a position where it assures that the operator cannot (at least conveniently) both be on the platform and also put the platform circuitry in its fold configuration. This is a valuable safety provision.

While platform selector switch 17 is shown as a conventional blade type selector switch, it will be understood that any other type of circuit selector means can be used instead, provided that it enables selection of the circuitry shown extending from contacts 19 and 20 to a single lead shown extending to contact 18. For example, persons skilled in the art will recognize that "common" contact 18 need not be only a single contact, but instead could be two contacts connected to a single lead, and instead of a "swinging" selection by a pivoted blade, the selection could be made by selectively bridging the contacts 19 and 20 to one or the other of the two "common" contacts. Therefore the term "common" is used in a circuitry sense, rather than in a physical sense. The term "contact" is used broadly as representative of circuit locations where switching functions are accomplished; and terms "contactor" and "selector" are used interchangeably for the means which accomplishes the selection function.

It will also be understood that instead of having a motor pump combination to operate the hydraulic cylinder, a directly geared electric motor may be provided instead. Similarly, instead of a down-enabling operation such as the solenoid valve, it is possible to power or to brake the movement.

It is also evident that straight hydraulic circuitry can be substituted for the electric circuitry shown, and manually operable valves for solenoid-operated valves. Therefore, the term "switch" is not to be limited to electrical structures, but encompasses all devices capable of controlling power, such as valves. Therefore, it will be understood that this invention is not to be limited by the embodiment shown in the drawings and described in the description which is given by way of example and not of limitation, but only in accordance with the scope of the appended claims.

I claim:

1. In combination with a vehicle tailgate lift of the type which includes a platform that is adapted to be moved up and down in a lifting mode while substantially level, and which is adapted to be folded and unfolded in a folding mode when a mechanical selector means is set in a platform-fold position, a power means for exerting power to raise and to fold said platform, and down movement enabling means enabling the folded or raised platform to unfold or to lowe, a control and safety circuit comprising:

a platform limit switch whose position is adapted to be altered by said mechanical selector means when in its platform-fold position and said platform is near its uppermost position;

an off-on platform fold switch;

an off-on platform up switch;

an off-on platform down switch;

a platform selector switch having a first condition which enables platform fold movement and a second condition which enables the platform to move upward between lower and upper elevations without folding, said selector switch having a selector, a common contact, and two selectible contacts, one respective to each of said conditions, the selector being adapted selectively to interconnect said common contact and said selectible contacts;

an energy source connected to said common contact;

said platform fold switch being connected between the selectible contact respective to said platform fold enablement and said power means, whereby to enable or disable said power means for platform fold movement when said platform selector switch is in said first condition;

said platform limit switch and platform up switch being connected in series with one another, and between the said selectible contact respective to said platform upward enablement and said power means, said platform limit switch disabling its circuit when the platform is near its uppermost position and said mechanical selector means is in its said first condition, this circuit being in parallel connection with the circuit which includes said platform fold switch, whereby this latter circuit enables said power means for platform up movement when both of its switches are closed and disables it when either one is open, when said platform selector switch is in said second condition;

said platform down switch being connected between said selectible contact respective to said platform upward enablement and a return circuit, whereby to enable or disable said lift for platform down movement.

2. A combination according to claim 1 in which said power means comprises a piston-cylinder assembly driving the platform in its up and in its folding movement, and a motor-pump combination to provide motive fluid to said assembly, and in which a down-valve which permits or prevents exhaust of fluid from said assembly is under control of said platform down switch.

3. A combination according to claim 2 in which a check valve is disposed between said pump and said assembly, permitting only unidirectional flow from said pump to said assembly, said down valve being connected to said assembly downstream from said check valve.

4. A combination according to claim 1 in which said energy source is electrical and said switches are all electrical switches.

5. A combination according to claim 2 in which said energy source is electrical, and said switches are all electrical switches.

6. A combination according to claim 1 in which said platform-fold switch is located sufficiently remote from said platform to frustrate its operation by a person on said platform.

* * * * *